United States Patent

Fukaishi

[11] Patent Number: 6,167,181
[45] Date of Patent: Dec. 26, 2000

[54] OPTICAL FIBER LIGHT AMPLIFIER

[75] Inventor: Kosuke Fukaishi, Tokyo, Japan

[73] Assignee: NEC Corporation, Tokyo, Japan

[21] Appl. No.: 09/225,004

[22] Filed: Jan. 4, 1999

[30]   Foreign Application Priority Data

Jan. 7, 1998  [JP]  Japan .................................. 10-013323

[51] Int. Cl.[7] .................................................. G02B 6/02
[52] U.S. Cl. .............................. 385/123; 385/12; 385/32; 372/70
[58] Field of Search ..................................... 385/123, 142, 385/12, 32, 141, 147, 127, 128; 359/341, 345, 337, 177, 179; 372/6, 29, 40, 70, 75, 102

[56]           References Cited

U.S. PATENT DOCUMENTS

| 5,245,690 | 9/1993 | Aida et al. | 385/142 |
| 5,471,334 | 11/1995 | Masuda et al. | 359/177 |

FOREIGN PATENT DOCUMENTS

| 4-356984 | 12/1992 | Japan . |
| 4-364790 | 12/1992 | Japan . |
| 5-327104 | 12/1993 | Japan . |
| 6-164020 | 6/1994 | Japan . |
| 6-268305 | 9/1994 | Japan . |
| 6-308547 | 11/1994 | Japan . |
| 6-334238 | 12/1994 | Japan . |
| 7-22687 | 1/1995 | Japan . |
| 7-5070 | 1/1995 | Japan . |
| 7-123059 | 5/1995 | Japan . |
| 9-107141 | 4/1997 | Japan . |
| 9-97941 | 4/1997 | Japan . |

OTHER PUBLICATIONS

Japanese Office Action dated Oct. 12, 1999, with partial translation.

*Primary Examiner*—Phan T. H. Palmer
*Attorney, Agent, or Firm*—McGinn & Gibb, PLLC

[57]           ABSTRACT

An erbium-doped optical fiber for amplifying a light signal 1 is wound to form a plurality of nearly-closed rings 1*a* that are arranged in a flat expanded configuration. A light-receiving device 4 receives a spontaneous emission light emitted by the entirety of erbium-doped optical fiber 1 and supplies an electric signal corresponding to the received spontaneous emission light. A laser diode 2 supplies a pumping light to the erbium-doped optical fiber 1 to create a population inversion in the erbium-doped optical fiber. An output-control device 3 controls an output of laser diode 2 in response to the electric signal supplied from the light-receiving device 4. The light-receiving device 4 is located so that the light-receiving device can receive the spontaneous emission light emitted from the entirety of the rings 1*a*.

16 Claims, 3 Drawing Sheets

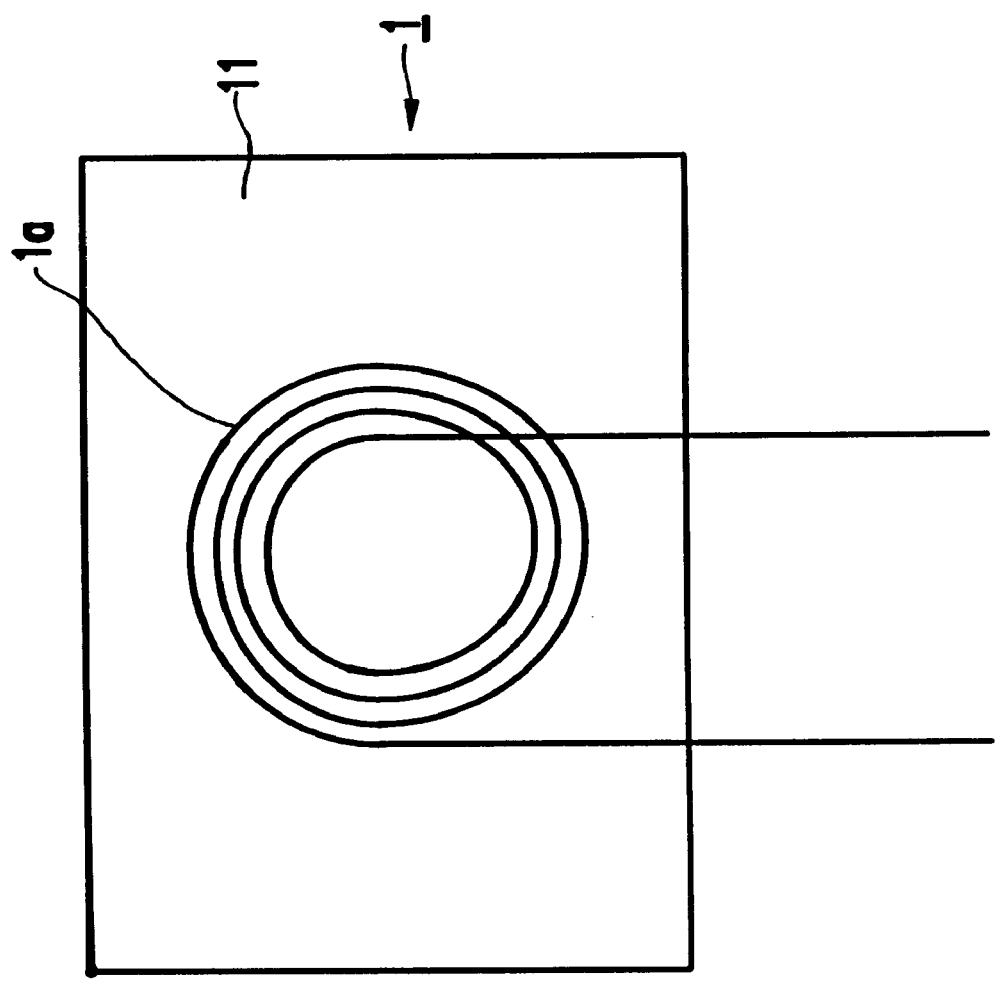

OPTICAL FIBER LIGHT AMPLIFIER

BACKGROUND OF THE INVENTION

1. Field of the Invention

The present invention relates to a light amplifier, particularly to an optical fiber amplifier of controllable gain doped with a rare earth element such as erbium. The erbium-doped fiber will be hereinafter referred to as EDF.

2. Description of the related art

A wide variety of devices has been proposed in the field of EDF light amplifiers. For example, Japanese Patent Laid-open No. 22687/95 (hereinafter, referred to as reference 1) describes an EDF light amplifier capable of performing a constant-gain control even when an input of a light signal is absent.

In reference 1, a light signal and a reference signal that has a wavelength slightly different from that of the light signal are entered into the EDF which has been placed in a state of population inversion by a pumping light supplied from a laser diode. Stimulated emission is caused in the EDF by both the light signal and the reference signal. A part of the output from the EDF is optically filtered to extract the reference signal component, which is in turn converted to an electric signal. A laser driving circuit controls the output of the laser diode in response to the electric signal. Controlling the output of the laser diode so that the ratio of the filtered light signal to the reference signal is constant yields a constant-gain control. In this way, a constant-gain control become feasible even when an input of a light signal is absent.

Japanese Patent Laid-open No. 97941/97 describes an EDF light amplifier in which a light signal component of a desired wavelength included in a wavelength-multiplex light signal is controlled to have a constant output level. Hereinafter, this light amplifier is referred to as reference 2.

In the light amplifier of reference 2, the light signal component of the desired wavelength is modulated at a prescribed frequency beforehand. The wavelength-multiplex light signal including the light signal of concern is entered into the EDF that has been placed in a state of population inversion, thereby causing a stimulated emission of radiation.

A part of the output of the EDF is converted to an electric signal, from which an electric signal of the prescribed frequency is filtered. The detected level of the filtered electric signal is supplied to a control circuit, which controls the intensity of the pumping light corresponding to the light signal of the prescribed frequency. In this way, the light signal of a prescribed wavelength is controlled so as to have a desired signal level.

Japanese Patent Laid-open No. 327104/93 (hereinafter, referred to as Reference 3) describes a light amplifier of a low noise figure.

In this light amplifier, a pumping light creates population inversion in the EDF; a light signal fed to the EDF gives rise to stimulated emission of the EDF, causing amplification of the light signal; the amplified light signal is attenuated by a high-loss optical fiber; and a part of the output of the high-loss optical fiber is fed back to control the intensity of the pumping light so as to adjust the output of the light amplifier. Due to the highloss optical fiber, the level of the pumping light becomes high compared to a light amplifier of the same output level having no high-loss optical fiber. The high intensity of the pumping light allows a low noise figure.

A light amplifier has been known from Japanese Patent Laid-open No. 364790/92 (hereinafter, referred to as Reference 4), in which the output of the light amplifier is adjusted to be constant by a plurality of pumping light sources.

In this amplifier, an input light signal is amplified by an EDF that is activated (placed in a state of a population inversion) by a pumping light fed from the plurality of pumping light sources. A part of the output light signal is branched to be converted to a first electric signal. The first electric signal is compared with a reference signal to generate an error signal. The error signal is branched into the plurality of error signal components corresponding to the number of the pumping light sources. Each error signal component is supplied to each of output control circuits. Each output control circuit controls the corresponding pumping light source. Each of output control circuits receives, as a feed-back signal, a second electric signal that is produced by photoelectric conversion of a branched part of the pumping light.

Each output control circuit controls the pumping light in two modes, a short-time response mode and a longtime response mode. In the long-time response mode, the output control circuit controls the pumping light source so as to minimize the error signal component. In the shorttime response mode, the output control circuit controls the pumping light source so as to minimize the deviation of the second electric signal from the error signal component. In this way, constant-output control is attained.

Another light amplifier has been proposed in which a depolarized light source is used to check polarization dependence of the gain associated with the pumping light. (Japanese Patent Laid-open No. 308547/94: This reference is referred to as Reference 5). In one specified embodiment, a passive polarization scrambler is used to depolarize the pumping light. The scrambler is connected with an output of the single-frequency laser that generates the pumping light.

The above-described references are mainly directed to the methods of performing a constant-output control, in which the intensity of the pumping light is controlled by an output of the fiber light amplifier.

However, there has been developed a fiber light amplifier based on other concept. In this fiber light amplifier, spontaneous emission (hereinafter, referred to as SE) emitted from an optical fiber doped with rare earth element, such as erbium, is detected when the optical fiber is in the state of population inversion, and the pumping light source is controlled by the detected value of the SE.

As is known well, the probability per photon that an input light signal induces stimulated emission, i.e., macroscopically, the ratio of the intensity of the output light signal with respect to the intensity of the input light signal, or the gain of the fiber light amplifier, is proportional to the number of the rare earth atoms in a state of population inversion.

Since the intensity of the SE as well is proportional to the number of the rare earth atoms in a state of population inversion, the intensity of the SE is proportional to the gain of the fiber light amplifier.

For this reason, control of the SE by controlling the pumping light implies a control of the gain by controlling the pumping light.

The fiber light amplifier based on the SE concept above is shown in FIG. 1.

Referring now to FIG. 1, a light signal applied to input terminal A is transmitted to EDF 5 through optical branching circuit 6 and isolator 7. Monitor (photo-detector) 8 monitors the part of the light signal that has branched at optical branching circuit 6.

A pumping light emitted by pumping light source 2 is entered into EDF 5 through optical multiplexer 9. The population inversion produced in EDF 5 by the pumping light causes to amplify the input light signal. The amplified light signal is taken out from output terminal B through optical multiplexer 9 and optical isolator 10.

EDF 5 is wound in a shape of a coil and is fixed. Photo-detector 4 for detecting the SE emitted from EDF 5 is arranged radially above the side surface of the EDF coil, as is shown in FIG. 2.

Photo-detector 4 detects the SE emitted from EDF 5. The output of photo-detector 4 is supplied to output-control section 3, which in turn controls the bias current of pumping light source (laser diode) 2 in response to the intensity of the SE, thereby adjusting the gain of the light amplifier to be constant.

A problem in a light amplifier of the earlier development described above has been in the structure of the fiber amplifier that the EDF is wound to shape a coil, above the side surface of which photo-detector 4 is settled, as is depicted in FIG. 2.

In this structure, photo-detector 4 detects an SE emitted only from the outermost wound EDF. Since the intensity of the SE emitted from the EDF depends on the longitudinal position of the fiber, monitoring of the SE emitted from only a certain special position does not provide information about the SE sufficient to carry out a precise constant-gain control. For this reason, it is necessary to conduct monitoring of the SE over the entire length of the EDF.

SUMMARY OF THE INVENTION

The present invention is directed to solving the above-described problem. It is an object of the present invention to provide a light amplifier capable of performing detection of the spontaneous emission precise enough to carry out an accurate constant-gain adjustment and also capable of promoting feasibility of reducing the size of the light amplifier.

In order to attain the object above, a light amplifier according to the present invention comprises: an optical fiber doped with an rare earth element for amplifying a light signal wound to form a plurality of nearly-closed rings, the plurality of nearly-closed rings being arranged in a flat expanded configuration; a light-receiving device for receiving a spontaneous emission light emitted from the optical fiber and supplying an electric signal corresponding to the received spontaneous emission light; pumping light source for supplying a pumping light to the optical fiber to create a population inversion in the optical fiber; and an output-control circuit for controlling an output of the pumping light source in response to the electric signal supplied from the light-receiving device.

Since the plurality of nearly-closed rings are arranged in a flat expanded configuration, the spontaneous emission emitted from the entirety of the optical fiber can be detected.

The above and other objects, features, and advantages of the present invention will become apparent from the following description referring to the accompanying drawings which illustrate examples of a preferred embodiment of the present invention.

BRIEF DESCRIPTION OF THE DRAWINGS

FIG. 7 is a schematic diagram showing the configuration of the EDF of the second embodiment of the present invention.

DETAILED DESCRIPTION OF THE PREFERRED EMBODIMENTS

Figure 1:
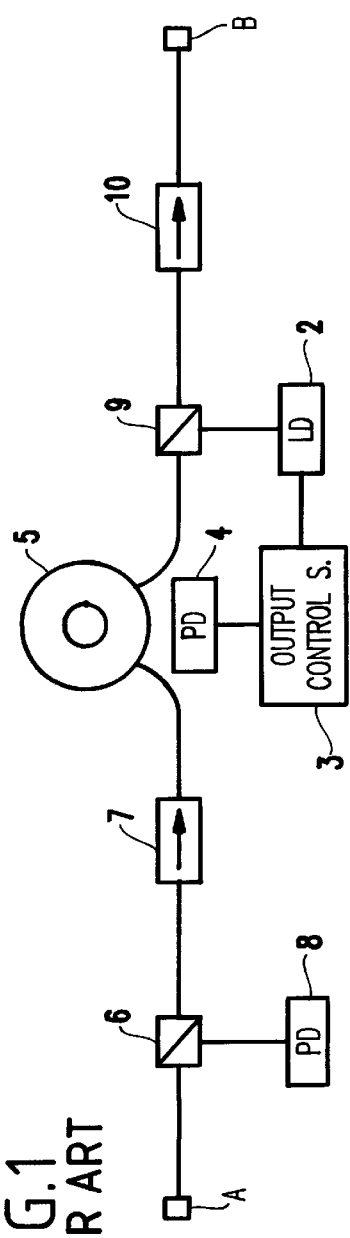
FIG. 1 is a block diagram illustrating the structure of a fiber amplifier of an early technology.
Figure 3:
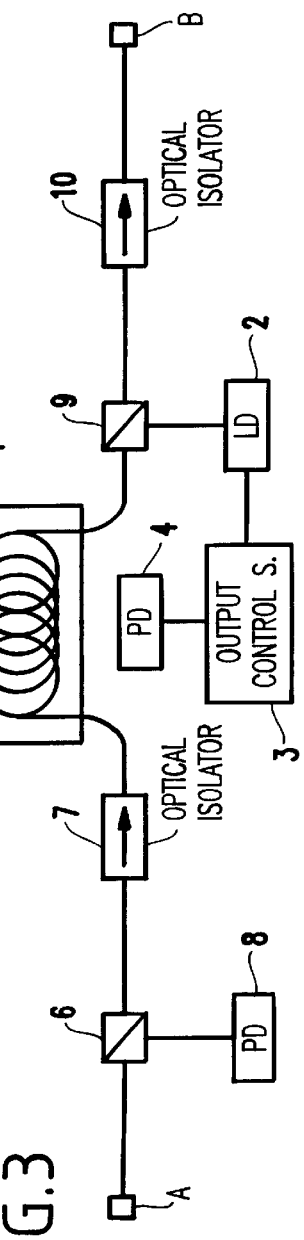
FIG. 3 is a block diagram illustrating the structure of the fiber amplifier in a first embodiment of the present invention.
Figure 5:
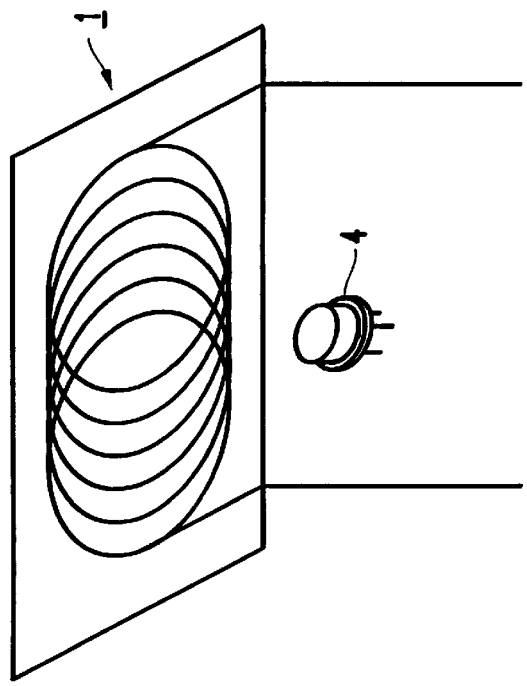
FIG. 5 is a perspective view illustrating the relative position of the EDF and SE receiver in the first embodiment.

FIG. 3 is a block diagram of a first embodiment of the light amplifier according to the present invention. In the Figure, the same parts as those in FIG. 1 are labeled with the same reference numbers.

In this embodiment, erbium is doped to the optical fiber as a typical example of a rare earth element.

The light amplifier comprises optical branching circuit 6, optical isolator 7, EDF 1, monitor 8, optical multiplexer 9, optical isolator 10, pumping light source (laser diode LD) 2, output control section 3 and SE receiver (photo-detector PD) 4.

A light signal to be amplified is applied to input terminal A. Optical branching circuit 6 branches a part of the input light signal from a main part to be amplified. Monitor 8 is a light-receiving element such as a photodiode and receives the part of the branched light signal, thereby monitoring the level of an incoming light signal. Optical isolators 7 and 10 block a spurious oscillation caused by multiple reflections of the light beam within the light amplifier.

EDF 1, activated or pumped by an input pumping light beam, produces population inversion and performs stimulated emission in response to an input light signal. The erbium atoms doped to the optical fiber make spontaneous emission.

While the stimulated emission is confined within the optical fiber due to the refractive index of the optical fiber wall, the spontaneous emission (SE) propagates toward the exterior as well as the interior of the optical fiber.

PD 4 (SE receiver 4) receives the SE emitted by EDF 1 and converts the received SE to an electric signal. Output control section 3 provides an output of an output control signal in response to the electric signal supplied from PD 4. Pumping light source (LD) 2 generates a pumping light for pumping EDF 1 in response to the output control signal.

Optical multiplexer 9 serves to transmit the output of EDF 1 to optical isolator 10 as well as to transmit the pumping light supplied from LD 2 to EDF 1. The amplified light signal is transmitted outside from output terminal B through optical isolator 10.

Figure 4:
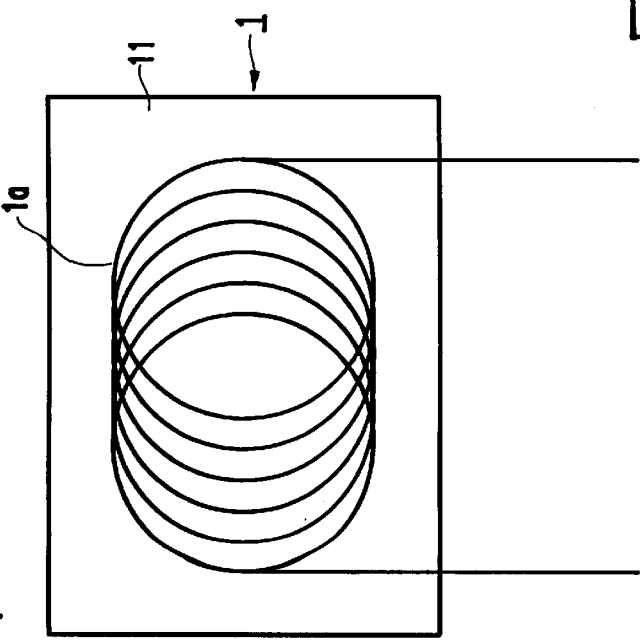
FIG. 4 is a schematic diagram showing the configuration of the EDF of the first embodiment of the present invention.

FIG. 4 represents EDF 1 of the present embodiment.

EDF 1 of the present embodiment is wound to form a plurality of substantially circular rings, each ring 1a being shifted laterally with respect to the adjoining ring so that the plurality of substantially circular rings have a flat expanded configuration. The circular rings are sealed and fixed on a resin sheet 11 or the like, as is shown in FIG. 4. PD 4 is placed to face the resin sheet 11 so that PD 4 can receive the SE emitted from the entirety of EDF 1.

Figure 2:
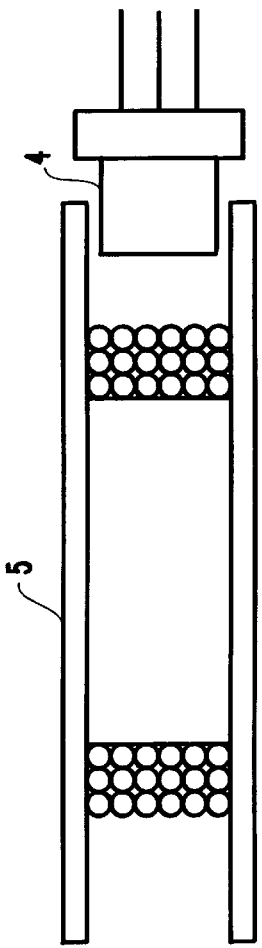
FIG. 2 is a sectional view illustrating the relative position of the photo-detector and EDF in the fiber amplifier shown in FIG. 1.

This structure of the light amplifier according to the present invention differs from that shown in FIG. 2 in that the entire EDF rings are exposed to PD 4, thereby enabling correct information to be acquired about the SE.

In operation, a light signal received at terminal A is guided to EDF 1 through optical branching circuit 6 and optical isolator 7. A part of the input light signal is branched at optical branching circuit 6 and monitored by monitor 8.

A pumping light beam is guided to EDF 1 from pumping light source 2 through optical multiplexer 9 to produce a population inversion in the electronic states of erbium atoms. The input light signal induces transitions of the electronic states to cause the stimulated emission.

The light generated by the stimulated emission is guided, as an amplified light signal, to output terminal B through optical multiplexer 9 and optical isolator 10. Since EDF 1 is arranged between optical isolators 7 and 10, a spurious oscillation due to multiple light reflections is suppressed.

EDF 1 emits an SE as well as the stimulated emission. The SE as well varies with a change in an output of LD 2. Forming EDF 1 in a flat configuration and locating PD 4 above EDF 1 with its entire rings exposed to PD 4 allow PD 4 to detect the SE emitted from entire EDF 1. The output of PD 4 is supplied to output-control section 3 to create an output-control signal.

The output-control signal is supplied to LD (pumping light source) 2 to control the bias current thereof, thereby enabling to adjust the intensity of the pumping light and further enabling to control the gain of the light amplifier as well as the level of the SE to be constant.

It is to be noted that the gain of the light amplifier linearly depends on the intensity of the SE emitted from the entire length of EDF. For this reason, the detection of the SE emitted from the entire length of EDF 1 is indispensable to perform a precise adjustment of the gain of the light amplifier.

Next, a second embodiment of the present invention will be explained below.

Figure 6:
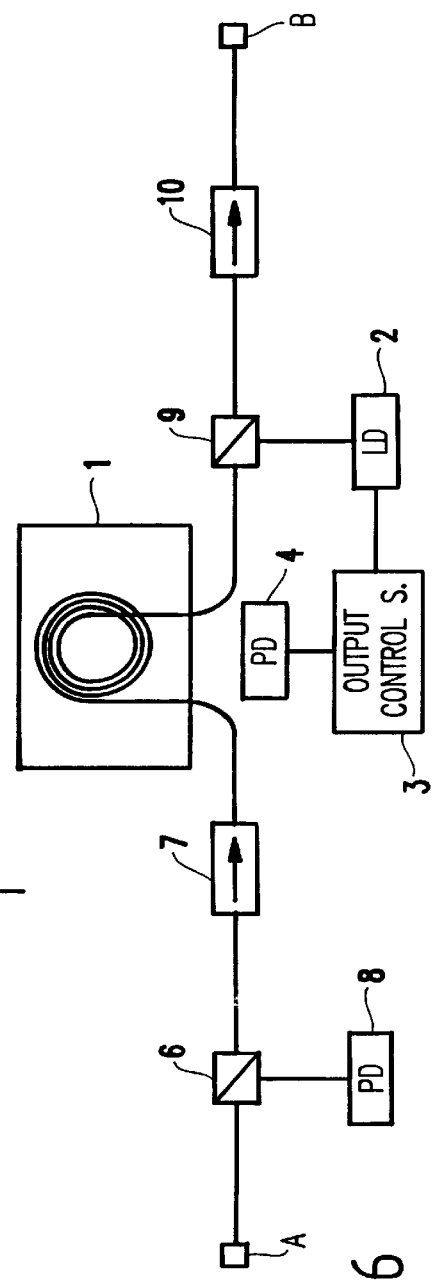
FIG. 6 is a block diagram illustrating the structure of the fiber amplifier in the second embodiment of the present invention.

FIG. 6 is a block diagram of the second embodiment. As is known by comparing FIG. 6 with FIG. 3, the constitution of the light amplifier shown in FIG. 6 is similar to that shown in FIG. 3 except EDF 1. For this reason, the same reference numbers are labeled to the corresponding parts in the light amplifiers shown by FIGS. 6 and 3, and the explanation about FIG. 6 will be omitted for simplicity.

Unlike the first embodiment, EDF 1 of the second embodiment is spirally wound radially inwardly with circular rings having decreasing radii. The EDF 1 is sealed and fixed on a resin sheet 11 or the like, as is shown in FIG. 7.

In the second embodiment, both ends of EDF 1 are spaced apart from each other by 30 mm and led out of the resin sheet 11. The light amplifier of the second embodiment operates in a similar manner to that of the first embodiment.

In summary, since the EDF of the present invention has an expanded sheet-like structure, it is enabled to detect the spontaneous emission emitted from the entirety of the doped optical fiber. As a result, it become enabled to carry out a precise constant-gain control and also to reduce the volume for mounting the doped optical fiber, thereby reducing the size of the light amplifier.

It is to be understood, however, that although the characteristics and advantages of the present invention have been set forth in the foregoing description, the disclosure is illustrative only, and changes may be made in the shape, size, and arrangement of the parts within the scope of the appended claims.

What is claimed is:

1. A light amplifier comprising:

an optical fiber doped with a rare earth element for amplifying a light signal wound to form a plurality of nearly-closed rings, said plurality of nearly-closed rings being arranged in a flat expanded configuration;

light-receiving means for receiving a spontaneous emission light emitted from said optical fiber to generate an electric signal corresponding to the received spontaneous emission light;

pumping light source means for supplying a pumping light to said optical fiber downstream from said plurality of nearly-closed rings to create a population inversion in said optical fiber; and output-control means for controlling an output of said pumping light source means in response to said electric signal supplied from said light-receiving means.

2. A light amplifier as claimed in claim 1, wherein said plurality of nearly-closed rings are formed so that each ring thereof is shifted relative to an adjoining ring in a predetermined direction within a predetermined plane, and said plurality of nearly-closed rings of said optical fiber are fixed on a sheet.

3. A light amplifier as claimed in claim 2, wherein said sheet is made of resin.

4. A light amplifier as claimed in claim 1, wherein said plurality of nearly-closed rings are formed to be a flat spiral and said plurality of nearly-closed rings are fixed on a sheet.

5. A light amplifier as claimed in claim 4, wherein said sheet is made of resin.

6. A light amplifier as claimed in claim 1, wherein said light-receiving means is located so that said light-receiving means can receive said spontaneous emission light emitted by the entirety of said plurality of rings.

7. A light amplifier as claimed in claim 1, wherein said pumping light source means is a laser diode and said output-control means controls a bias current of said laser diode.

8. The light amplifier as claimed in claim 1, wherein said plurality of nearly-closed rings are spirally wound radially inward with circular rings having decreasing radii.

9. A light amplifier comprising:

an optical fiber doped with a rare earth element for amplifying a light signal wound to form a plurality of nearly-closed rings, said plurality of nearly-closed rings being arranged in a flat expanded configuration, said plurality of nearly-closed rings adapted to accept an input light signal and produces output signal;

light-receiving means for receiving a spontaneous emission light emitted from said optical fiber to generate an electric signal corresponding to the received spontaneous emission light;

pumping light source means for supplying a pumping light to said optical output signal to create a population inversion in said optical fiber; and output-control means for controlling an output of said pumping light source means in response to said electric signal supplied from said light-receiving means.

10. A light amplifier as claimed in claim 9, wherein said plurality of nearly-closed rings are formed so that each ring thereof is shifted relative to an adjoining ring in a predetermined direction within a predetermined plane, and said plurality of nearly-closed rings of said optical fiber are fixed on a sheet.

11. A light amplifier as claimed in claim 10 wherein said sheet is made of resin.

12. A light amplifier as claimed in claim 9, wherein said plurality of nearly-closed rings are formed to be a flat spiral and said plurality of nearly-closed rings are fixed on a sheet.

13. A light amplifier as claimed in claim 12 wherein said sheet is made of resin.

14. A light amplifier as claimed in claim 9, wherein said light-receiving means is located so that said light-receiving means can receive said spontaneous emission light emitted by the entirety of said plurality of rings.

15. A light amplifier as claimed in claim 9., wherein said pumping light source means is a laser diode and said output-control means controls a bias current of said laser diode.

16. The light amplifier as claimed in claim 9, wherein said plurality of nearly-closed rings are spirally wound radially inward with circular rings having decreasing radii.

\* \* \* \* \*